March 31, 1942.  M. D. SANDERS  2,277,718
SLUDGE TREATMENT
Filed Nov. 9, 1936

Marion D. Sanders
INVENTOR

ATTEST-

Patented Mar. 31, 1942

2,277,718

UNITED STATES PATENT OFFICE 2,277,718

SLUDGE TREATMENT

Marion D. Sanders, Chicago, Ill., assignor to Industrial Patents Corporation, Chicago, Ill., a corporation of Delaware Application November 9, 1936, Serial No. 110,008

11 Claims. (Cl. 210—2)

This invention relates to the treatment of sludge and to the product thereof.

One of the objects of the invention is to provide a method for the treatment of sludge derived from packing house wastes.

Another object of the invention is to provide a new product of value as an animal food.

Another object of the invention is to provide an organic substance of value in soil fertilization.

Another object of the invention is to provide a novel product high in protein value.

Another object of the invention is to provide an economical and effective method for dewatering sludges of high protein content.

Other objects of the invention will be apparent from the description and claims which follow.

In my copending application entitled Treatment of wastes, Serial No. 110,007, filed November 9, 1936, which has matured into United States Patent No. 2,204,703, I have described and claimed an improved method for treating wastes such as packing house wastes, by which a concentrated suspension of proteins is flocculated from packing house wastes by the addition of a mineral acid and a protein coagulant. As will be apparent from the specification, the process therein described involves conditioning the protein in packing house wastes rich in protein, and substantially dewatering the conditioned protein.

Various methods have been employed from time to time in the treatment of sewage, the object of all such methods being to develop a relatively innocuous effluent by the removal of solids therefrom in the form of a sludge. The primary objects of sewage treatment methods being relative purification of the water or effluent, the sludge has constituted a major problem in the art.

Sludge from some types of sewage has been used to a small extent to provide organic ingredients for fertilizer mixtures, but ordinary sludge from sewage treatment plants has little economic value and is often a source of expense due to the necessity of some disposition. In some large plants the sludge is filtered and incinerated, constituting a major item of expense of sewage treatment.

The present invention is directed to sludge produced by the treatment of wastes high in protein.

In the drawing, similar characters of reference in the several figures indicate similar parts.

Figure 1:
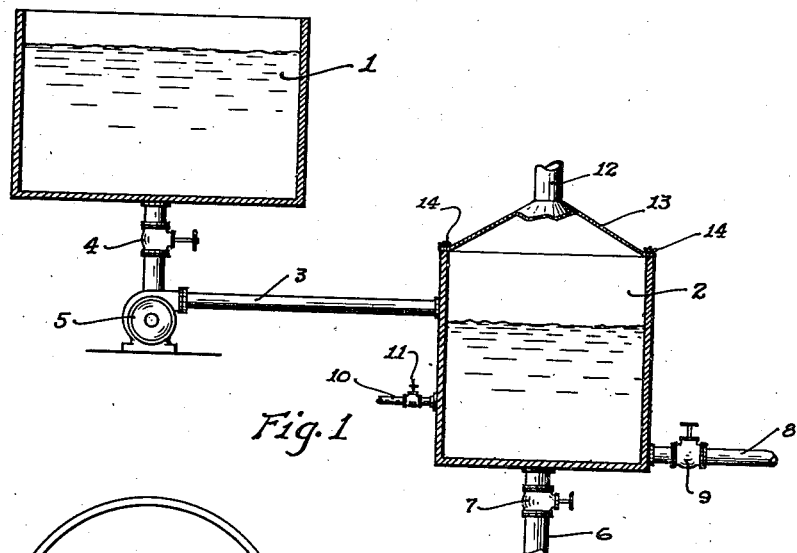
Figure 1 is a side view, partly in section, of equipment which may be employed in carrying out the process of the present invention.
Figure 2:
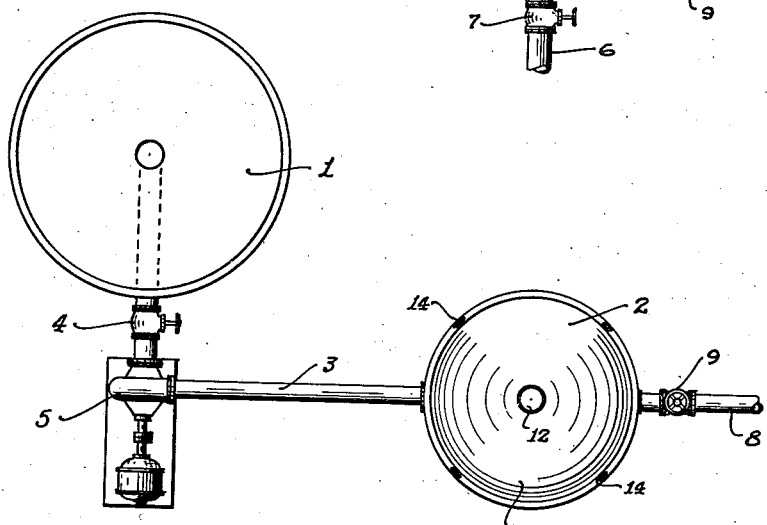
Figure 2 is a plan view of the layout shown in Figure 1.

Sludge derived, for example, from packing house wastes stored in sludge pit 1 may be passed to sludge cooker 2 through pipe 3 provided with valve 4. Sludge from sludge pit 1 is delivered to cooker 2 by the action of pump 5. It will be understood, of course, that any desired means may be employed for transferring sludge from the sludge pit to the cooker.

Sludge recovered from packing house wastes in accordance with the method described in my copending application aforesaid has a solids content of approximately 3 to 6 per cent.

A satisfactory procedure may employ a 1500 gallon sludge cooker. After the sludge cooker is filled with sludge, heat is applied to coagulate the proteins in the sludge, causing the major portion of solids to separate from the water in a manner which will hereinafter be more particularly described. The coagulated sludge may then be removed from the sludge cooker through pipe 6 provided with valve 7. In carrying out the process with the equipment shown in the drawing, the sludge is permitted to ferment in the sludge pit or in the sludge cooker for a period of about twenty-four hours at a temperature of from 65 degrees to 110 degrees Fahrenheit after which I have found that the effect of the heat in the sludge cooker is to cause the coagulated sludge to form a thick, semi-solid mass or scum at the top of the cooker, having a solids content of from 12 to 20 per cent.

After coagulation in this manner, the relatively clear water beneath the concentrated sludge is withdrawn through pipe 8 provided with valve 9. The concentrated sludge is removed through pipe 6, as has been pointed out, and dehydrated by any appropriate means sufficiently to form a granular, compact, solid material which is relatively high in protein.

Any desired means may be employed for heating the sludge as direct steam injection through inlet 10 provided with valve 11. Vent pipe 12 is provided in cover 13 secured by lugs 14.

I have found that heat is an effective means for facilitating dewatering of the sludge. If the raw sludge is heated without conditioning by fermentation, the effect of the heat is to form large discrete particles dispersed throughout the liquid, which may be readily removed by known filtration methods. According to one aspect of the present invention, therefore, the raw sludge high in protein is conditioned for filtration by the application of heat in any desired manner although direct steam injection is the most efficient method. The temperature of the raw sludge is raised to a point above 150 degrees Fahrenheit, preferably to a temperature of from about 180 degrees to 200 degrees Fahrenheit, at which the phenomenon of the formation of large discrete particles reaches its optimum.

As is well known, it is usual in the employment of vacuum filters for dewatering sludge to accumulate about one pound of dry solid per square foot of filter area per hour although I have found in practice that with raw sludge derived from packing house wastes but one-half pound of dry solids per square foot of filter area may be accumulated per hour with a vacuum filter.

I have found that heating raw sludge derived from packing house wastes at the temperatures indicated for a period of five minutes permits the accumulation of four pounds of dry solids per hour for each square foot of filter area. The efficiency of filtration is not materially affected by the temperature of the liquid at the time of filtration.

It will be readily appreciated that the present invention, which involves the heating of slugs to facilitate dewatering, greatly increases the efficiency of known dewatering procedures.

Examples of tests of the heat coagulation of sludge from chemically precipitated packing house wastes are given in the following table which gives the analyses of the coagulated or substantially dewatered sludge collected in a supernatant layer in the sludge cooker. The sludge treated in both tests was fermented twenty-four hours at 70 degrees Fahrenheit and then heated to 180 degrees Fahrenheit by the direct injection of steam.

|  | Test No. 1, per cent | Test No. 2, per cent |
| --- | --- | --- |
| Raw sludges | 4.01 solids | 4.36 solids |
| Coagulated sludge | 20.6 solids | 14.50 solids |
| Drainings from coagulated sludge | 0.75 solids | 0.77 solids |
| Per cent total solids recovered as coagulated sludge | 95.0 | 86.5 |

The preferred procedure in carrying out the present invention on packing house wastes or liquids high in protein values involves the preliminary fermentation of the sludge, which has already been described. This fermentation is in no sense a digestion for the purpose of destroying volatile matter, and the fermentation is not carried to anything approaching substantial digestion of volatile matter. The material is permitted to remain at a temperature of approximately 65 degrees to 110 degrees Fahrenheit for a period of twenty-four hours, which is sufficient to develop some gas in the liquid before the application of heat and the consequent coagulation of the proteins. The gas thus formed effectively carries the coagulated material to the top of the vessel, forming a layer of semi-solids or scum, which has already been discussed. The substantially dewatered sludge thus obtained is removed from the cooker and further dried. In practice, I have successfully dried this dewatered sludge containing about 12 per cent solids by first concentrating to about 60 per cent solids in a hydraulic press and then further drying the cakes thus produced to an end product having 90 per cent solids. A conventional rotary or other drier may be used in this procedure.

Another effective procedure for preparing the relatively dry end product desired involves the employment of a steam jacketed drying kettle equipped with stirrers having a forced draft in the kettle to carry away the evaporated moisture. It will be readily understood that any evaporator or drier may be employed to produce a relatively dry end product, consideration being had for the purpose to which it is desired to put the end product. The end product which results from the treatment of normal packing house wastes in accordance with the present invention will vary in analysis depending upon the operations of the packing house. The character of the end product will be readily understood by reference to the following table:

|  | Sample A | Sample B |
| --- | --- | --- |
|  | Per cent | Per cent |
| Moisture | 4.40 | 5.0 |
| Fat | 35.22 | 23.8 |
| Protein | 40.38 | 46.4 |

Sample A in the foregoing table was produced from a packing house waste secured from a grease skimming basin which was relatively inefficient.

Sample B was produced from packing house waste which had been efficiently degreased and contained in the original state aproximately 100 parts per million of fat.

In addition to protein, fat, and moisture, the end product contains some inert substances and small quantities of calcium phosphate, ferric oxide, and other minerals.

Depending upon market conditions for inedible greases, the high grease content which appears in the foregoing sludge cake as shown in the foregoing table may be economically reduced to about 10 per cent and the protein percentage correspondingly raised by hot-pressing the substantially dewatered sludge in a hydraulic press or extracting the fat with appropriate solvents. The dried sludge cake constitutes a new product high in food value comparable in characteristics to digester tankage, which is an important ingredient of animal feed used in swine and other livestock feeding.

In preparing the sludge cake of the present invention for use in animal feeds, it is merely necessary to grind it, whereupon it is in condition for packaging and shipment or immediate used.

The term "sludge" is used in the foregoing specification in three distinct senses, which will be readily understood from the context.

In the first place, it is used in the usual accepted sense as referring to the liquid layer relatively high in solids which accumulates at the bottom of a settling tank in conventional sewage treatment methods and which is removed from the settling tank in accordance with the procedure described and claimed in my copending application entitled Treatment of wastes, Serial No. 110,007 which matured into Patent No. 2,204,703, June 18, 1940.

In the second place, the term "sludge" in this specification is applied to the raw sludge which has been heated without preliminary fermentation. This coagulated sludge does not differ from raw sludge in solids content, but does differ from raw sludge in its physical characteristics, particularly in filterability.

In the third place, the term "sludge" is applied to the substantially dewatered sludge found as an upper layer in the sludge cooker after the heat treatment of preliminarily fermented raw sludge, In addition to these meanings of the term "sludge," the term is employed in a modifying sense indicative of source to the dried end product. The term "sludge" must be understood to be broad enough to include material recovered from wastes, which material has a higher solids content than the waste from which it is recovered.

I claim:

1. The method of concentrating sludge which comprises fermenting the sludge sufficiently to form gas therein, but insufficiently to substantially digest the sludge, and then heating the fermented sludge to form a substantially dewatered sludge.

2. The method of recovering protein material from sludge which comprises fermenting the sludge sufficiently to form gas therein, heat-coagulating the proteins, floating the coagulated material with the gas formed in the sludge, and recovering the float.

3. The method of treating sludge derived from packing house wastes which comprises fermenting the sludge sufficiently to form gas therein, heating the sludge to a temperature above 150 degrees Fahrenheit to coagulate the proteins in the sludge, collecting a substantially dewatered sludge in a supernatant layer, and thereafter drying the substantially dewatered sludge.

4. The method of treating sludge derived from packing house wastes which comprises fermenting the sludge sufficiently to form gas therein, heating the sludge to a temperature of from 180 degrees to 200 degrees Fahrenheit to coagulate the proteins in the sludge, collecting a substantially dewatered sludge in a supernatant layer, and thereafter drying the substantially dewatered sludge.

5. The method of recovering solids from sludge derived from packing house wastes which comprises fermenting the sludge sufficiently to form gas therein, forming discrete particles by heating the sludge to a temperature of from 150 degrees to 200 degrees Fahrenheit, floating the discrete particles with the gas formed in the sludge, and thereafter recovering the discrete particles from the sludge.

6. The method of treating sludge derived from packing house wastes containing protein which comprises fermenting the sludge sufficiently to form gas therein, coagulating the proteins by heating the sludge to a temperature of from 150 degrees to 200 degrees Fahrenheit to coagulate the proteins, and floating the coagulated proteins with the gas formed in the sludge.

7. The method of concentrating chemically precipitated packing house wastes which comprises fermenting the chemically precipitated wastes sufficiently to form gas therein, but insufficiently to substantially digest the chemically precipitated wastes, and then heating the fermented wastes to form a substantially dewatered chemically precipitated waste.

8. The method of recovering proteins from chemically precipitated packing house wastes containing proteins which comprises fermenting the chemically precipitated wastes sufficiently to form gas therein, forming discrete particles in the chemically precipitated wastes by heating the chemically precipitated packing house wastes to a temperature above 150 degrees Fahrenheit, and thereafter recovering the discrete particles from the chemically precipitated wastes.

9. The method of recovering solids from chemically precipitated packing house wastes which comprises fermenting the chemically precipitated wastes sufficiently to form gas therein, forming discrete particles by heating the chemically precipitated wastes to a temperature of from 150 degrees to 200 degrees Fahrenheit, floating the discrete particles with the gas formed in the chemically precipitated wastes, and thereafter recovering the discrete particles from the chemically precipitated wastes.

10. The method of treating chemically precipitated packing house wastes containing proteins which comprises fermenting the chemically precipitated wastes sufficiently to form gas therein, coagulating the proteins by heating the chemically precipitated wastes to a temperature of from 150 degrees to 200 degrees Fahrenheit, floating the coagulated proteins with the gas formed in the chemically precipitated wastes and collecting and drying the floated proteins.

11. The method of recovering protein material from chemically precipitated packing house wastes which comprises fermenting the chemically precipitated wastes sufficiently to form gas therein, heating the fermented product to coagulate the proteins, floating the coagulated product with the gas formed in the fermentation and recovering the floated material.

MARION D. SANDERS.